United States Patent
Li et al.

(10) Patent No.: US 12,372,073 B2
(45) Date of Patent: Jul. 29, 2025

(54) PROPELLANT APPLIED TO A THRUSTER AND METHOD OF MANUFACTURING THE SAME

(71) Applicants: Yueh-Heng Li, New Taipei (TW); Chao-Wei Huang, Tainan (TW); Wei-Cheng Lo, Tainan (TW); Tsung-Ying Yang, Tainan (TW)

(72) Inventors: Yueh-Heng Li, New Taipei (TW); Chao-Wei Huang, Tainan (TW); Wei-Cheng Lo, Tainan (TW); Tsung-Ying Yang, Tainan (TW)

( * ) Notice: Subject to any disclaimer, the term of this patent is extended or adjusted under 35 U.S.C. 154(b) by 0 days.

(21) Appl. No.: 18/407,661

(22) Filed: Jan. 9, 2024

(65) Prior Publication Data

US 2025/0223950 A1 Jul. 10, 2025

(51) Int. Cl.
| | |
|---|---|
| F03H 1/00 | (2006.01) |
| C06B 33/00 | (2006.01) |
| F02K 9/10 | (2006.01) |
| F02K 9/24 | (2006.01) |

(52) U.S. Cl.
CPC ........... *F03H 1/0012* (2013.01); *C06B 33/00* (2013.01); *F02K 9/10* (2013.01); *F02K 9/24* (2013.01)

(58) Field of Classification Search
None
See application file for complete search history.

(56) References Cited

U.S. PATENT DOCUMENTS

| | | | |
|---|---|---|---|
| 3,373,062 A * | 3/1968 | Morris | C06B 45/32 149/6 |
| 10,047,731 B2 | 8/2018 | Deshpande et al. | |
| 2004/0020397 A1* | 2/2004 | Nielson | F42B 1/032 102/476 |
| 2023/0002085 A1 | 1/2023 | Rafalskyi et al. | |

OTHER PUBLICATIONS

William Yeong Liang Ling, et al., "A brief review of alternative propellants and requirements for pulsed plasma thrusters in micropropulsion applications", Chinese Journal of Aeronautics, Jun. 20, 2020, pp. 3002~3008, School of Aerospace Engineering, Beijing Institute of Technology, Beijing 100081, China.

Yueh-Heng Li, et al., "Plasma Behavior in a Solid-Fed Pulsed Plasma Thruster", Journal of Aeronautics, Astronautics and Aviation, vol. 51, No. 1, pp. 031-042 (2019), DOI: 10.6125/JoAAA. 201903_51(1).03.

* cited by examiner

*Primary Examiner* — Aileen B Felton
(74) *Attorney, Agent, or Firm* — Rosenberg, Klein & Lee (57) ABSTRACT

A propellant applied to a thruster, especially a pulsed plasma thruster, has a composition including a polymer and a metal powder material mixed with the polymer. A method of manufacturing the propellant includes dissolving polymer particles in a solvent for generating a solution, adding a powdered metal material to the solution for obtaining a mixture, and drying the mixture for removing the solvent from the mixture. Accordingly, a dried mixture is acquired and defined as a metal composite polymer which serves as the composition of the propellant. Accordingly, the use of the propellant allows a decrease in the voltage involved in a (Continued)

punching process and an efficient reduction in the energy consumption and assists the thruster in increasing the propulsive efficiency.

8 Claims, 5 Drawing Sheets

FIG. 7

PROPELLANT APPLIED TO A THRUSTER AND METHOD OF MANUFACTURING THE SAME

BACKGROUND OF THE INVENTION

1. Field of the Invention

This invention relates to a propellant and relates particularly to a propellant which is applied to a thruster and contains a polymer and a metal powder material mixed with the polymer and to a method of making the propellant.

2. Description of the Related Art

CubeSates are a class of nanosatellites using a standard size measuring 10 cm×10 cm×10 cm, with each unit weighing no more than 2 kilograms. Pulsed plasma thrusters are usually used to provide the CubeSates with thrust so that the CubeSates can have the maneuverability, and the orbit trip time of the CubeSates can be lengthened.

A pulsed plasma thruster is a form of electric spacecraft propulsion and involves an interaction between an electric field and a magnetic field whereby plasma is accelerated for generating thrust. The solid-fed pulsed plasma thruster is a common pulsed plasma thruster and has a simple structure. The operation of this thruster mainly includes exerting high voltage between a cathode and an anode for discharging and generating an arc of electricity. Accordingly, the electric arc passes through a solid propellant in a punching process, and the ionization occurs to generate plasma. A high current is generated while discharging, which allows the flow of electrons to induce a magnetic field and allows the magnetic field to interact with an electric field for generating an electromagnetic field which exerts a Lorentz force on the plasma. This force accelerates the plasma out of an exhaust of the thruster, thereby generating thrust. Generally, polytetrafluoroethylene (PTFE) is used as a solid propellant of the pulsed plasma thruster. PTFE, a synthetic fluoropolymer of tetrafluoroethylene, is a high-molecular-weight polymer consisting of carbon and fluorine and is hydrophobic. However, the dielectric coefficient of PTFE is extremely high, so high voltage is required while passing the electric arc through PTFE. The ablation rate of PTFE is also low. These conditions may have an adverse effect on the propulsive efficiency of the thruster. PTFE is also involved in high costs and is not easily processed. Another material, pure polymethyl methacrylate (PMMA), may be used as a solid propellant of the pulsed plasma thruster. PMMA is non-toxic and is allowed to generate plasma with lower voltage whereby thrust is generated. However, the thrust generated by PMMA is lower than the thrust generated by PTFE. Therefore, the conventional propellants of the thruster such as the pulsed plasma thruster still need to be improved.

SUMMARY OF THE INVENTION

An object of this invention is to provide a propellant of a thruster and a method of manufacturing the propellant which is capable of decreasing voltage involved in a punching process, increasing the thrust, and reducing the energy consumption.

According to this invention, a propellant is applied to a thruster. The thruster is, preferably, a pulsed plasma thruster and mainly includes a thruster body having a hollow chamber and an anode and a cathode respectively disposed in the hollow chamber. The propellant is mounted in the hollow chamber. The thruster can further include a power source connected to the anode and the cathode, an igniter disposed on the cathode, and an exhaust unit located on one side of the hollow chamber and in communication with an outside. Particularly, the composition of the propellant is a metal composite polymer. That is, the propellant has a composition including a polymer and a metal powder material mixed with the polymer. When the igniter conducts an igniting operation, the generation of at least one electric arc between the anode and the cathode ablates the propellant so that plasma is generated on a surface of the propellant and then discharged out of the thruster body through the exhaust unit, thereby producing thrust efficiently.

This invention also relates to a method of manufacturing the propellant. The method includes a dissolving step, a powder adding step, and a drying step. Regarding the dissolving step, this step includes preparing a solvent and a solute which is in the form of polymer particles and then dissolving the solute in the solvent to generate a solution. Regarding the powder adding step, this step includes introducing a powdered metal material into the solution to generate a mixed solution and stirring the mixed solution evenly to acquire a mixture. Regarding the drying step, this step includes putting the mixture into a drying device and drying the mixture in the drying device for removing the solvent from the mixture. Accordingly, a dried mixture is acquired and thus defined as a metal composite polymer. The metal composite polymer is the composition of the propellant. After conducting the above steps in sequence, the metal composite polymer contains a polymer and a metal powder material mixed with the polymer.

According to the above, the propellant of this invention is derived from a mixture made by mixing the polymer with the metal powder material. The propellant can be used as a solid propellant of a pulsed plasma thruster. The propellant is non-toxic and allows the generation of the thrust under lower voltage in the process of passing the arc through the propellant. Therefore, the energy consumption can be efficiently reduced, and the propulsive efficiency of the thruster can be increased.

Preferably, the metal composite polymer acquired in the drying step contains a polymer derived from polymethyl methacrylate and a metal powder material made of iron powder. In one preferred embodiment, regarding the polymer contained in the propellant, a polymer content ranges from 80 wt % to 95 wt %, and regarding the metal powder material contained in the propellant, a metal powder content ranges from 5 wt % to 20 wt %.

Preferably, in one preferred embodiment, the method further includes an injecting step executed after the powder adding step and a demolding step executed after the drying step. The injecting step is executed by pouring the mixture into a mold. The demolding step includes a releasing operation serving to release the dried mixture from the mold after the mold is dried by the drying device. In another preferred embodiment, it is possible that the demolding step further includes a cooling operation executed before the releasing operation and adapted to cool the dried mold.

DETAILED DESCRIPTION OF THE PREFERRED EMBODIMENTS

Figure 1:
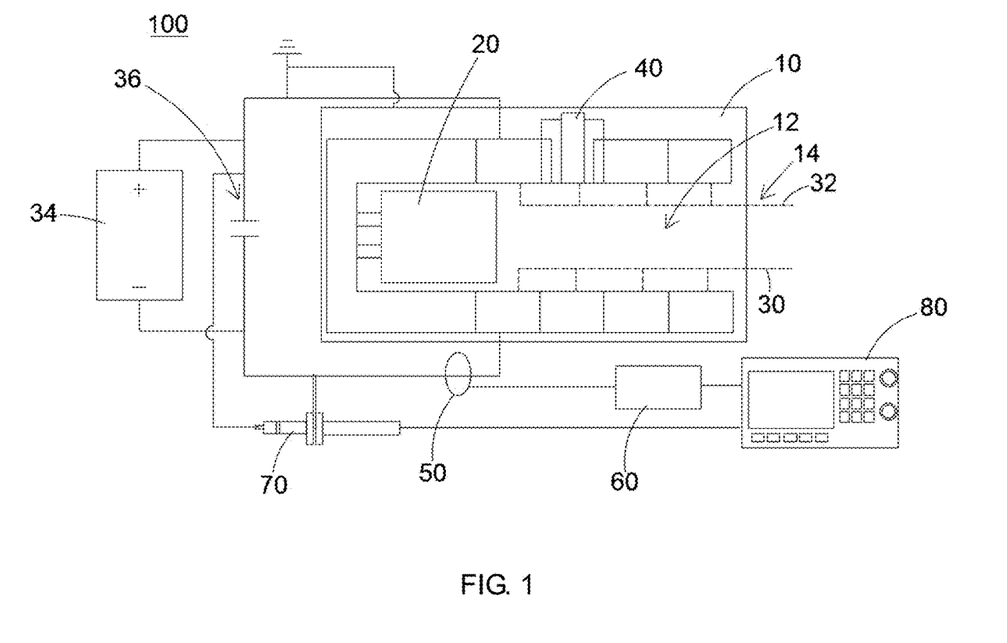
FIG. 1 is a schematic view showing a propellant of a first preferred embodiment of this invention applied to a thruster.

Referring to FIG. 1, a first preferred embodiment of a propellant applied to a thruster is shown. The thruster can be a pulsed plasma thruster or other thrusters, and herein a pulsed plasma thruster 100 is adopted as an example. The thruster 100 includes a thruster body 10, a propellant 20, an anode 30, and a cathode 32. The thruster body 10 includes a hollow chamber 12, and the hollow chamber 12 can be in a state of vacuum. The anode 30 and the cathode 32 are respectively disposed in the hollow chamber 12 and spaced apart from each other. In this preferred embodiment, it is possible that the pulsed plasma thruster 100 further includes an igniter 40 and a power source 34 connected to the anode 30 and the cathode 32. The igniter 40 can be, preferably, disposed on the cathode 32. The anode 30 and the cathode 32 are connected to opposing electrodes of the power source 34, respectively. Furthermore, the thruster body 10 has an exhaust unit 14 located on one side of the hollow chamber 12. The exhaust unit 14 is in communication with an outside.

The pulsed plasma thruster 100 may also include a boost circuit unit 36 serving to supply required high voltage, an electrical device such as Rogowski 50, an integrator 60, a high voltage probe 70, and an oscilloscope 80. These elements are mainly used to detect and measure items such as the voltage and the current and then display the measured results on the oscilloscope 80. Accordingly, the value of the thrust generated by the thruster 100 can be estimated according to the detection and measurement of these items.

The propellant 20 is disposed in the hollow chamber 12 and spaced apart from the anode 30 and the cathode 32. The composition of the propellant 20 is a metal composite polymer. Explicitly, the propellant 20 contains a polymer and a metal powder material, and the metal powder material is mixed with polymer. The polymer can be polymethyl methacrylate (PMMA). The metal powder material can be iron powder. In addition, the propellant 20 can include a polymer content ranging from 80 wt % to 95 wt % and a metal powder content ranging from 5 wt % to 20 wt %. In other words, the polymer contained in the propellant 20 is between 80 wt % and 95 wt %, and the metal powder material contained in the propellant 20 is between 5 wt % and 20 wt %. In this preferred embodiment, it is adopted that the metal composite polymer is manufactured by mixing polymethyl methacrylate with iron powder, denoted by (PMMA@FE) in the figures. It is also possible that different materials with different proportions may be properly adopted to make the metal composite polymer. Accordingly, the propellant 20 can be used as a solid propellant of the pulsed plasma thruster 100. When the igniter ignites and the power source 34 exerts voltage, an electric discharge phenomenon between the anode 30 and the cathode 32 occurs, and at least one electric arc is created between the anode 30 and the cathode 32. The electric arc bombards to pass through the surface of one of the electrodes and ablates the propellant 20. Accordingly, plasma is generated on the surface of the propellant 20. Furthermore, a high current is generated by discharging, and the plasma induces a magnetic field because of the discharging process. The high current interacts with a self-induced magnetic field to exert a Lorentz force on the plasma, thereby accelerating the movement of the plasma and then discharging the accelerated plasma from the exhaust unit 14 of the thruster body 10 at high velocity for generating thrust.

Figure 7:
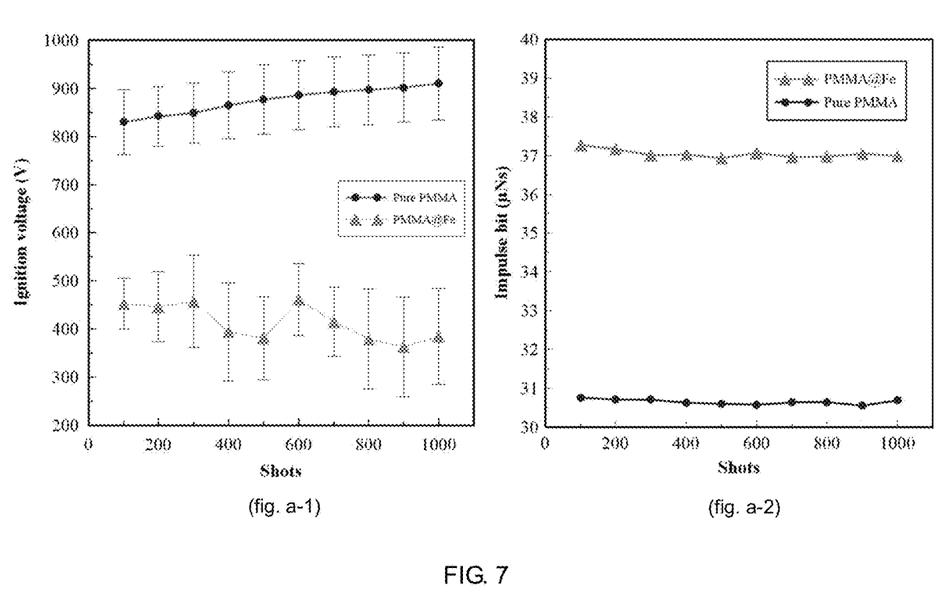
FIG. 7 shows the experiments applying different propellants to a pulsed plasma thruster, wherein (fig. a-1) is a line graph which shows the comparison between the ignition voltage caused by using a conventional propellant (PMMA) and the ignition voltage caused by using the propellant (PMMA@Fe) of this invention, and (fig. a-2) is a line graph which shows the comparison between the impulse bit caused by using the conventional propellant (PMMA) and the impulse bit caused by using the propellant (PMMA@Fe) of this invention.

With respect to the above operation, the composition of the propellant 20 is acquired by mixing the polymer with the metal powder material, and especially the mixing operation includes adding the iron powder to polymethyl methacrylate. This propellant 20 can be used to replace the conventional PTFE and the conventional PMMA. As a solid propellant of the thruster 100, the propellant 20 is not only non-toxic and safe but also conducive to a decrease in the voltage whereby the arc passes through the propellant 20 efficiently during a punching or passing-through process. Therefore, the energy consumption can be reduced. The use of the propellant 20 also allows more plasma to be generated and then discharged under the same energy condition, with the result that the generated thrust is larger, and the power-to-thrust ratio is increased. Therefore, the propulsive efficiency of the thruster 100 is increased. The performance of the propellant 20 can be proved by FIG. 7. Referring to FIG. 7, it shows two experiments conducted by applying different solid propellants to the pulsed plasma thruster 100 under the same environment, the same conditions, and the same operating parameters. According to the experiments, the use of different solid propellants brings different effects to the operation of the pulsed plasma thruster 100. For example, in (fig. a-1) of FIG. 7, it shows the ignition voltage for the thruster 100, wherein the line graph is made to compare the ignition voltage caused by the use of pure polymethyl methacrylate (PMMA) with the ignition voltage caused by the use of the propellant 20 (PMMA@Fe) of this invention. The result shows that the use of the propellant 20 leads to lower ignition voltage, and thus the energy consumption involved in the igniting process of the thruster 100 can be reduced. In (fig. a-2) of FIG. 7, the line graph is made to compare the impulse bit caused by the use of pure polymethyl methacrylate (PMMA) with the impulse bit caused by the use of the propellant 20 (PMMA@Fe) of this invention. By comparison with the impulse bit of pure PMMA, the result shows that the impulse bit of the propellant 20 is increased by about 20%. According to these results, the thrust generated by using the propellant 20 is greater than the thrust generated by using the traditional propellant. In this case, more plasma can be generated with the aid of the propellant 20, and the acceleration of the plasma can also be attained for generating larger thrust. Thus, the use of the propellant 20 is conducive to the increase in the thrust.

Figure 2:
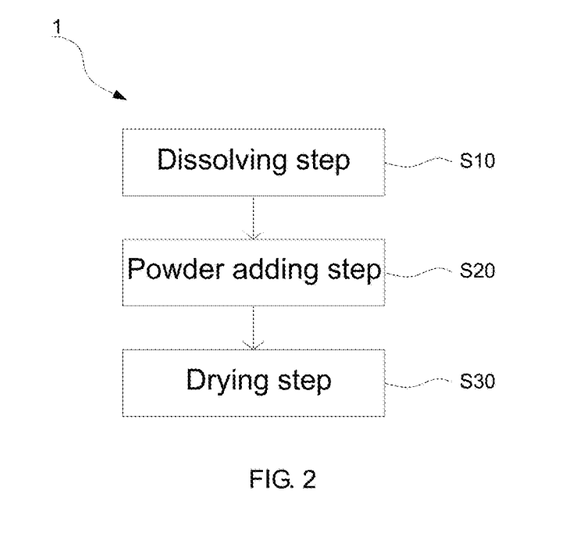
FIG. 2 is a block diagram showing execution steps of a first preferred embodiment of a method of manufacturing the propellant of this invention.
Figure 3:
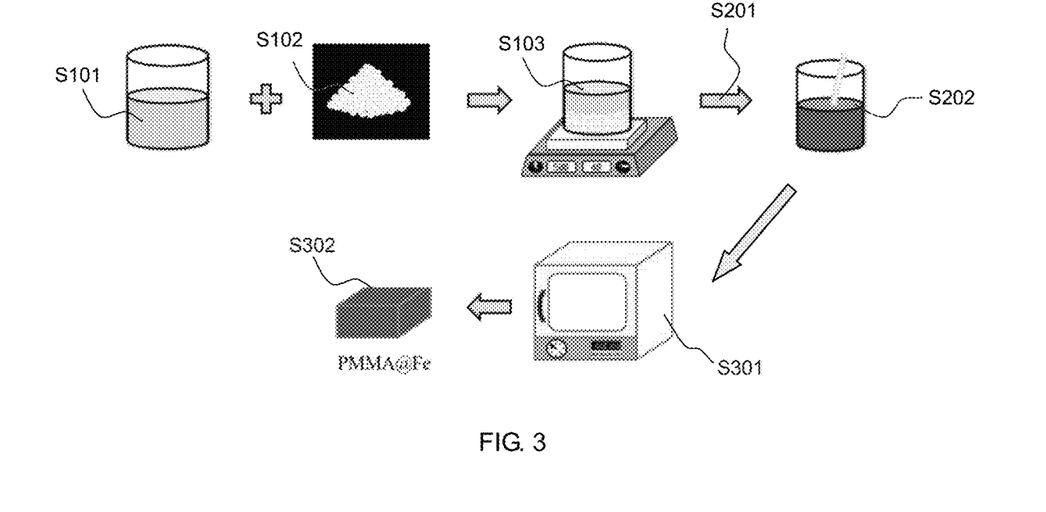
FIG. 3 is a schematic view of the first preferred embodiment showing the operation of manufacturing the propellant.

Referring to FIG. 2 and FIG. 3, a first preferred embodiment of a method 1 for manufacturing the propellant 20 of this invention includes a dissolving step S10, a powder adding step S20, and a drying step S30, described as follows.

Regarding the dissolving step S10, this step includes preparing a solute S102 and a solvent S101 and then dissolving the solute S102 in the solvent S101. After the solute S102 is fully dissolved in the solvent S101, a solution S103 is generated. Particularly, the solute S102, a dissolved substance, is in the form of polymer particles, preferably particles of polymethyl methacrylate (($C_5O_2H_8)_n$). The particles of polymethyl methacrylate can be, but not limited to, derived from the polymerization of methyl methacrylate (MMA) monomers or from the plastic injection of the polymethyl methacrylate (PMMA). The solvent S101 can be ethyl acetate ($C_4H_8O_2$) or other suitable materials. Furthermore, the proportion of the solute S102 to the solvent S101 can be one to three (1:3) or other suitable values to meet the needs.

Referring to FIG. 3, in this preferred embodiment, polymethyl methacrylate particles are defined as the solute S102, and ethyl acetate is used as the solvent S101. The experiment prepares 20 grams of polymethyl methacrylate particles and 60 milliliters of ethyl acetate solvent for mixing. This mixing proportion, namely one solute to three solvents, is adopted herein to fully dissolve the solute S102 with the minimum solvent S101, thereby reducing the generation of bubbles in the solute S102. This proportion also leads to lower costs and allows the material to be easily processed. Then, the polymethyl methacrylate particles S102 and the ethyl acetate solvent S101 are put into a jar and then stirred for dissolving the particles. After the polymethyl methacrylate particles S102 are fully dissolved in the ethyl acetate solvent S101, a solution S103 is generated. In this preferred embodiment, to obtain a preferable dissolving effect, the jar is put on a magnetic stirring device, and a stirring operation is executed by predetermining operating parameters. For example, the stirring operation is executed by the stirring speed at 500 rpm and at a temperature of 40° C., and the stirring time is 6 hours. Accordingly, the polymethyl methacrylate particles S102 can be fully dissolved.

Regarding the powder adding step S20, this step includes preparing a metal material in powder form as a powdered metal material S201 and introducing the powdered metal material S201 into the solution S103 to acquire a mixture S202. Particularly, the powdered metal material S201 can be iron powder or other suitable powders, and herein the iron powder is adopted in this preferred embodiment. The above introducing operation is briefly shown in FIG. 3 wherein the arrow represents the addition of the powdered metal material S201. After the powdered metal material S201 is added to the solution S103, a mixed solution is generated because of the introducing operation, and then the mixed solution is evenly stirred, preferably stirred with a glass rod. Finally, the mixture S202 is made after the stirring operation. In addition, the amount of the powdered metal material S201 added to the solution S103 can be adjusted to meet the needs.

Regarding the drying step S30, this step includes preparing a drying device S301, putting the mixture S202 into the drying device S301, and conducting a drying operation. The drying operation serves to dry the mixture S202 in the drying device S301, thereby removing the solvent S101 from the mixture S202. The drying operation and the removal of the solvent S101 turn the mixture S202 into a dried mixture S302, that is, a dried product without the solvent S101. The dried mixture S302 is finally defined as a metal composite polymer. The operating parameters are adjustable for conducting the drying operation, and in this preferred embodiment, the drying operation is executed at a temperature of 40° C., and the drying time is 36 hours, thereby removing the solvent S101. Furthermore, the metal composite polymer acquired by the drying operation serves as the composition of the propellant 20. Because of the drying operation, the metal composite polymer S302 contains a polymer and a metal powder material and especially contains a polymer content ranging from 80 wt % to 95 wt % and a metal powder content ranging from 5 wt % to 20 wt %. In this preferred embodiment, polymethyl methacrylate particles are used as the polymer particles, and the iron powder is used as the powdered metal material, with the result that the metal composite polymer S302 contains polymethyl methacrylate whose content ranges from 80 wt % to 95 wt % and the iron powder whose content ranges from 5 wt % to 20 wt %. By comparison with the pure polymethyl methacrylate (PMMA), the metal composite polymer S302 not only decreases the voltage involved in the punching process to a greater extent but also increases the thrust.

Figure 4:
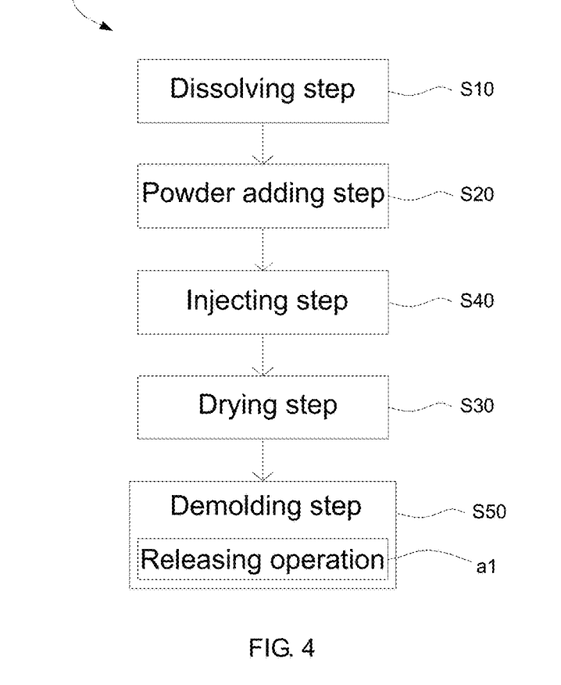
FIG. 4 is a block diagram showing execution steps of a second preferred embodiment of a method of manufacturing the propellant of this invention.

Referring to FIG. 4, a second preferred embodiment of this invention is shown. The concatenation of correlated elements, operations, and effects of the second preferred embodiment are the same as those of the first preferred embodiment and herein are omitted. The second preferred embodiment is characterized in that the method 1 further includes an injecting step S40 and a demolding step S50. Also referring to FIG. 5, the injecting step S40 is executed after the powder adding step S20. The injecting step S40 includes preparing a mold S401 whose size can be adjusted and pouring the mixture S202 into the mold S401. In this preferred embodiment, the mold S401 is 5 cm×5 cm×5 cm in size. Then, the mold S401 into which the mixture S202 is poured is put into the drying device S301 so that the mold S401 is dried by the drying operation and becomes a dried mold S401'.

Figure 5:
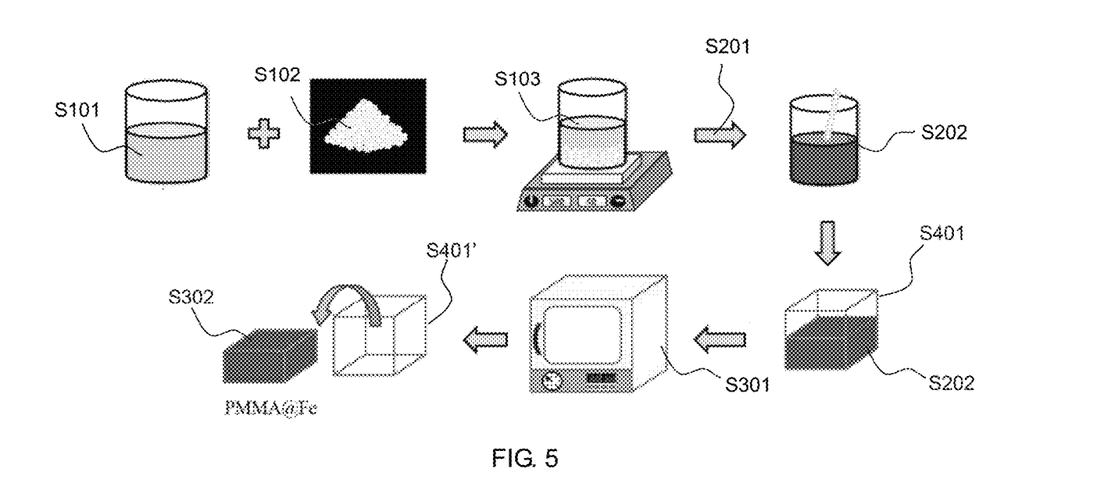
FIG. 5 is a schematic view of the second preferred embodiment showing the operation of manufacturing the propellant.

The demolding step S50 is executed after the drying step S30. The demolding step S50 includes taking the dried mold S401' out of the drying device S301 and then carrying out a releasing operation a1. The releasing operation a1 serves to release the dried mixture S302 from the dried mold S401'. Thereafter, the released dried mixture S302 is defined as the metal composite polymer S302.

Figure 6:
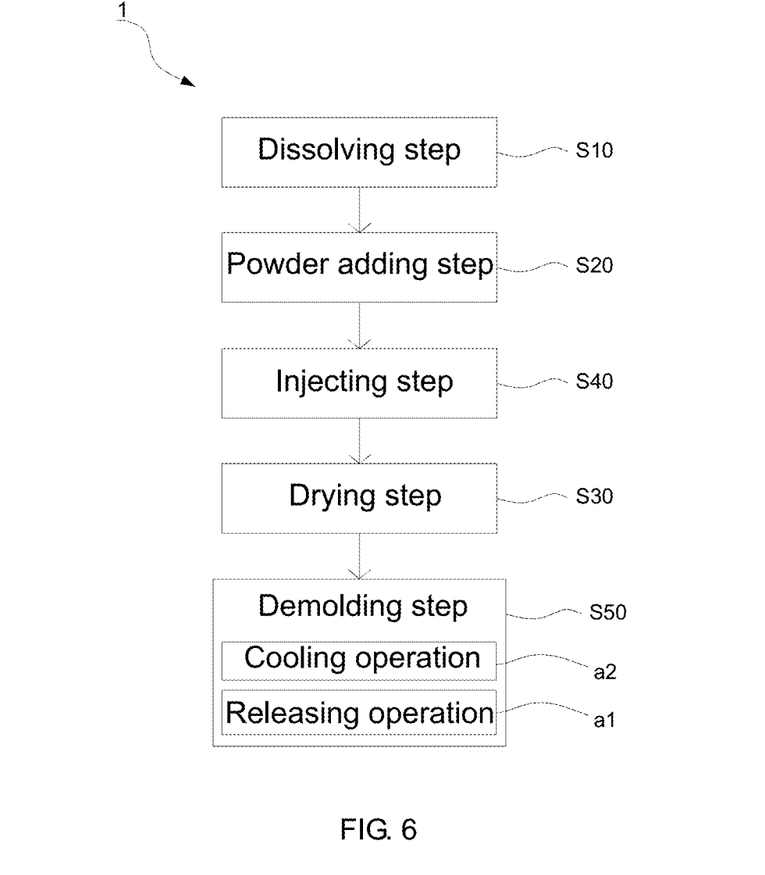
FIG. 6 is a block diagram showing execution steps of a third preferred embodiment of a method of manufacturing the propellant of this invention.

Referring to FIG. 6, a third preferred embodiment of this invention still includes the injecting step S40 and the demolding step S50 of the second preferred embodiment. The third preferred embodiment is characterized in that the demolding step S50 further subjects the dried mold S401' to a cooling operation a2 after taking the dried mold S401' out of the drying device S301. The cooling operating a2 is executed to cool the dried mold S401', preferably cool the dried mold S401' at a room temperature. Furthermore, the releasing operation a1 is executed after the cooling operation a2 for releasing the dried mixture S302 from the cooled dried mold S401'. It is possible that the dried mixture S302 is also cooled by the cooling operation a2. The operating parameters are adjustable for conducting the cooling operation a2, and in this preferred embodiment, the cooling operation a2 is executed at a room temperature of 25° C., and the cooling time is 24 hours. Thereafter, the releasing operation a1 is executed, thereby obtaining the metal composite polymer S302.

According to the above steps, the metal composite polymer S302 contains the polymer and the metal powder material. Herein, the metal composite polymer S302 is manufactured by mixing polymethyl methacrylate with the iron powder (PMMA@Fe). The metal composite polymer S302 is the composition of the propellant 20. According to an SEM/EDS analysis, the analysis shows chemical compositions of the metal composite polymer S302, including C (atom %) which is about 69.12, N (atom %) which is about 8.22, O (atom %) which is about 10.87, and Fe (atom %) which is about 11.79. As a solid propellant of the pulsed plasma thruster 100, this metal composite polymer S302 helps increase the power-to-thrust ratio for producing larger thrust, thereby increasing the propulsive efficiency. The propellant 20 of this invention made by mixing polymethyl methacrylate with the iron powder is non-toxic and involved in low costs, and FIG. 7 also proves that the propellant 20 is conducive to a decrease in the voltage used in the process of passing the arc through the propellant, thereby reducing the energy consumption. The use of the propellant 20 also generates larger thrust. Consequently, the metal composite polymer S302 allows the pulsed plasma thruster 100 to be applied to space missions which require larger thrust. The metal composite polymer S302 can also be used as a propellant of other propulsion systems, such as electric propulsion systems of the microsatellite or the nanosatellite. Therefore, the propellant has multipurpose applications.

To sum up, this invention takes advantage of a unique propellant having a polymer mixing with a metal powder material to replace conventional propellants. Especially, when this special propellant is used as a propellant of a pulsed plasma thruster, the required voltage involved in the punching process of the pulsed plasma thruster can be reduced to decrease the energy consumption, and the propulsive efficiency thereof can also be increased.

While the embodiments are shown and described above, it is understood that further variations and modifications may be made without departing from the scope of this invention.

What is claimed is:

1. A method of manufacturing a propellant adapted to be disposed in a thruster, said method comprising:
    a dissolving step including preparation of a solute and a solvent followed by dissolving said solute in said solvent, thus obtaining a solution generated after said solute is fully dissolved in said solvent, wherein said solute is a non-fluoropolymer in the form of polymer particles;
    a powder adding step including preparation of a metal material in a powder form as a powdered metal material, introducing said powdered metal material into said solution to generate a mixed solution, and stirring said mixed solution evenly to acquire a mixture; and
    a drying step including preparation of a drying device, putting said mixture into said drying device, and drying said mixture in said drying device for removing said solvent from said mixture, thus obtaining a dried mixture after said solvent is removed, said dried mixture being defined as a metal composite polymer, wherein said metal composite polymer contains a polymer and a metal powder material and serves as a composition of said propellant, wherein a polymer content of said polymer contained in said metal composite polymer acquired by said drying step ranges from 80 wt % to 95 wt %, and wherein a metal powder content of said metal powder material contained in said metal composite polymer ranges from 5 wt % to 20 wt %, and wherein the polymer content is larger than the metal powder content.

2. The method according to claim 1, wherein said solute is in the form of particles of polymethyl methacrylate $((C_5O_2H_8)_n)$, said solvent being ethyl acetate $(C_4H_8O_2)$, said powdered metal material being iron powder.

3. The method according to claim 1, wherein in said dissolving step, the proportion of said solute to said solvent is one to three.

4. The method according to claim 1, wherein said thruster is a pulsed plasma thruster.

5. The method according to claim 1, wherein said polymer is polymethyl methacrylate, and said metal powder material is iron powder.

6. The method according to claim 1, further comprising an injecting step executed after said powder adding step and a demolding step executed after said drying step, said injecting step including preparing a mold, pouring said mixture into said mold, and thence putting said mold in said drying device so that said mold is dried by said drying device to acquire a dried mold, said demolding step including taking said dried mold out of said drying device and then executing a releasing operation whereby said dried mixture is released from said dried mold, said released dried mixture thereby serving as said metal composite polymer.

7. The method according to claim 6, wherein said demolding step includes subjecting said dried mold to a cooling operation, said cooling operating being executed after taking said dried mold out of said drying device and adapted to cool said dried mold, said releasing operation being executed after said cooling operation for releasing said dried mixture from said cooled dried mold.

8. The method according to claim 7, wherein in said cooling operation, said dried mold is cooled at a room temperature.

* * * * *